Patented May 31, 1932

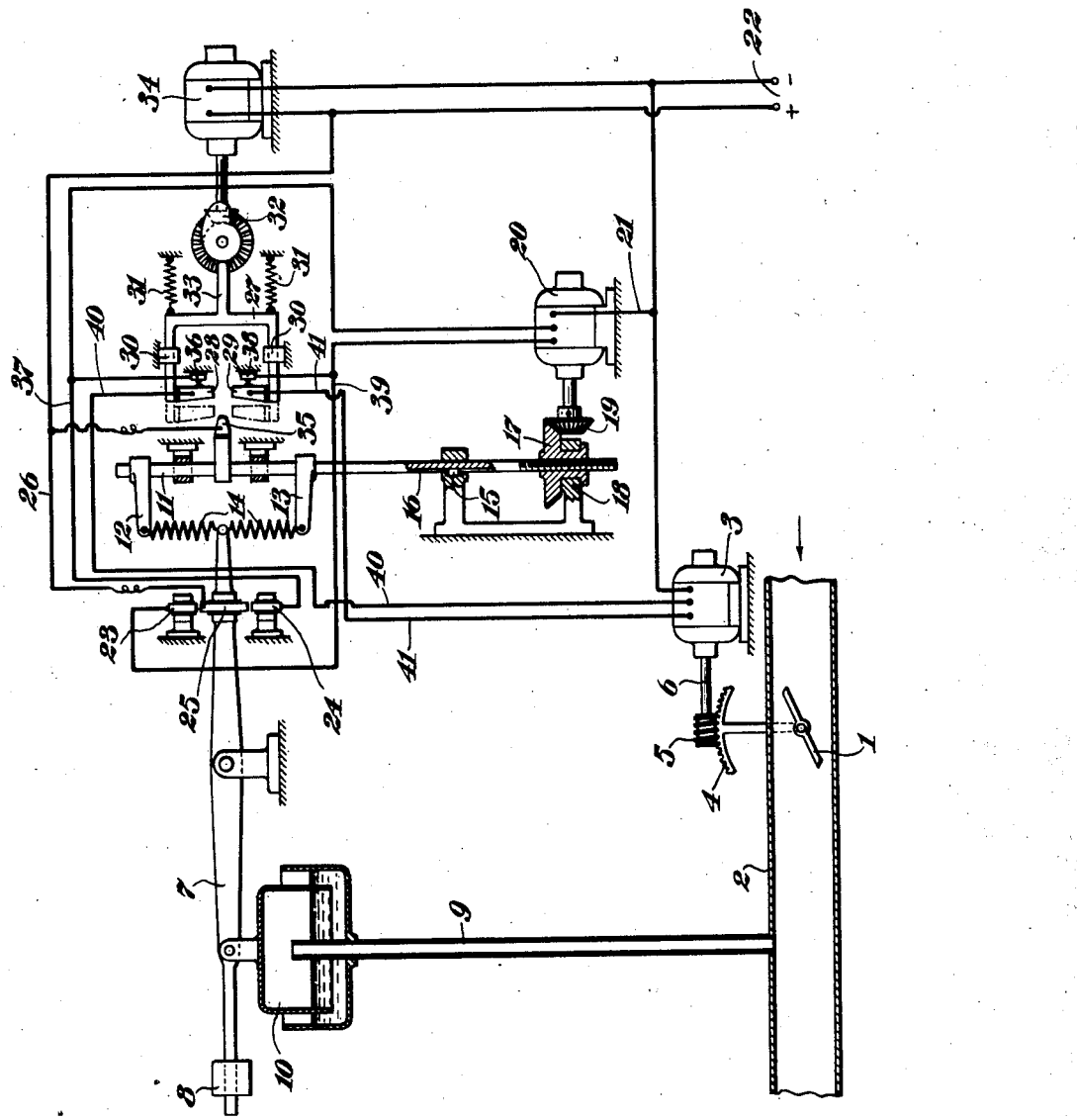

1,860,821

UNITED STATES PATENT OFFICE

CHARLES H. SMOOT, OF MAPLEWOOD, NEW JERSEY

REGULATOR

Application filed April 16, 1929. Serial No. 355,463.

My invention relates to the art of regulation and comprises a sensitive rapid acting anti-hunting regulator of the type wherein a force varying as a function of the element controlled opposes a regulating force to effect the regulation through auxiliary power means.

My present invention is in some respects like and in some respects unlike that of the regulator of my Patent No. 1,658,577 dated February 7, 1928, and comprises an improvement thereover whereby more rapid and accurate regulation may be obtained. As in the patented device, my regulator comprises a balance acted upon by a force varying as a function of the element controlled and by controlling forces which upon departure from neutrality throw into operation means for controlling the element and means for temporarily adding a force to the balance in a direction to restore equilibrium thereupon. In the patented device the addition of the temporary force to the balance, and the control of the element, were effected by two electric motors connected in parallel and consequently operated simultaneously, and the removal of the temporary force was effected by a third electric motor. In my present regulator, I have provided means whereby two motors, one effecting both the addition and removal of the temporary force and the other effecting the control of the element are connected in parallel during only a part of the time; the regulating motor being operated at times independently of the other to effect a micrometer adjustment and insure a complete restoration of the balance upon removal of the temporary force. The operation of my present regulator is such as to cause an initial over-travel of the regulated element followed by an automatic return to its final position.

For a better understanding of my invention reference should be had to the accompanying drawing in which one modification of my invention is illustrated as applied to the regulation of pressure.

Referring to the drawing, a damper 1 effects the control of the flow of fluid through a conduit 2. In the specific modification illustrated the damper is operated to maintain constant the fluid pressure at some point in the flow and is adjusted to the position corresponding to the desired pressure by a reversible electric motor 3 hereinafter called the regulating motor, which turns the damper in either direction by means of a rack 4 and worm gear 5 mounted on the shaft 6 of the motor. The regulating motor is brought into operation by means hereinafter described upon departure from the balanced condition of a pivoted lever 7.

The regulating force acting upon the balance lever 7 is in this instance a constant and comprises the weight 8. The force varying as a function of the element controlled is in this instance the pressure of the fluid flowing in conduit 2 which varies with the damper position, and this force is transmitted to the balance 7 by means of a pipe 9 connected to conduit 2 and terminating within an inverted pressure bell 10 partially submerged in liquid and carried by the lever 7.

Means for temporarily adding a force to the balance comprise a vertically movable rod 11 carrying between two projections 12 and 13 thereupon a tension spring 14, the mid point of which is attached to the end of lever 7. The rod 11 normally holds the spring 14 in such position as to exert no turning moment on the lever. The rod is movable vertically but is prevented from rotating by means of a fixed key 15 which rests in a longitudinal slot 16 in the rod. The lower portion of rod 11 is threaded and has mounted thereupon a gear 17 rotatably mounted in a stationary collar 18, which gear meshes with a gear 19 mounted on the shaft of a reversible electric motor 20, hereinafter termed the compensating motor. Operation of the compensating motor thus raises or lowers the rod 11 and thereby causes spring 14 to apply either an upward or downward force to the right-hand end of the balance depending upon the directions of rotation of the motor. One terminal of the compensating motor 20 is connected through lead wire 21 with one side of a source of power, indicated diagrammatically by the terminals 22, and the other terminals of the motor are connected to stationary contacts 23 and 24, located just above and just below, respectively, a contact 25 carried by the balance lever 7, which latter contact is connected by means of a conductor 26 with the other side of the source of power 22. The arrangement is such that a closure of contacts 23 and 25 due to a decrease in the fluid pressure within bell 10, causes the compensating motor to operate in such direction as to lower rod 11, thus adding a downward force to lever 7 by the increase in tension in the lower half of spring 14, which force is in a direction to return the balance to neutral. Conversely, closure of contacts 24 and 25 causes the compensating motor to raise rod 11 to apply, through spring 14, an upward force to the end of lever 7, or to remove the additional downward force if rod 11 had been displaced downward from normal position.

A frame 27, carrying electrical contacts 28 and 29, is mounted in bearings 30 to the right of the upper part of rod 11 and is adapted to be intermittently moved horizontally against the tension of springs 31 by a cam 32 bearing against a projection 33 on the frame. Cam 32 is continuously rotated by a motor 34 and is so shaped as to move frame 27 to the left for a relatively short period of time during each complete rotation of the cam. Rod 11 carries a contact 35 which is adapted to engage one or the other of contacts 28 and 29 when frame 27 is moved to the left and when rod 11 is in other than normal position. When frame 27 is returned to the right by springs 31 contact 28 engages a stationary contact 36 which is electrically connected through conductor 37 with contact 24, and contact 29 engages a stationary contact 38 electrically connected through conductor 39 with contact 23. Contacts 28 and 29 are connected to two of the terminals of the regulating motor 3 by lead wires 40 and 41 respectively, the other terminal of the motor being connected to the source of power.

The electrical connections are such that when frame 27 is held to the right, and contacts 28 and 29 engage contacts 36 and 38 respectively, the regulating motor is connected in parallel with the compensating motor, and if balance 7 has departed from neutral will operate to turn the damper in such direction as to restore neutrality. When cam 32 moves frame 27 to the left, no operation of the regulating motor occurs unless rod 11 is displaced from normal as neither contact 28 nor 29 will engage contact 35 unless contact 35 is displaced in one direction or another. If, however, rod 11 has been raised, due to closure of contacts 24 and 25 resulting from an increase in pressure within bell 10, or from a decrease in the controlling force, such as a shift of weight 8 to the right, contact 35 will engage contact 28 when frame 27 is moved to the left, thus closing one circuit for the regulating motor and causing it to close the damper. The regulating motor thus operates at times in the same direction as the compensating motor and in parallel therewith, and at other times acts independently of and in the same or opposite direction with the compensating motor.

The operation of the entire regulator is as follows: Assuming the apparatus to be initially in a condition of equilibrium with the pressure within bell 10 equal to that for which weight 8 is adjusted, motors 3 and 20 will be idle, balance 7 will be in neutral position with contact 25 out of engagement with either contact 23 or 24, and frame 27 will be reciprocated horizontally without closing the circuit of the regulating motor in either extreme position of movement. If now, for any reason, a change occurs in the flow through conduit 2, the balance of forces upon lever 7 will be upset by a change in pressure within bell 10. Assuming a change in flow in such direction as to cause an increase in pressure, lever 7 will be moved to close contacts 24 and 25 and to thus throw the compensating motor into operation in such a direction as to lift rod 11. The regulating motor will likewise be thrown into operation by the closure of contacts 24 and 25 for so much of each period of rotation of cam 32 as permits springs 31 to hold frame 27 to the right, and the direction of rotation of the regulating motor during these periods will be such as to tend to close damper 1. During the relatively short periods at which cam 32 forces frame 27 to the left, the regulating motor will be operated in the same direction, viz: to close the damper, as rod 11 is in a raised position due to operation of the compensating motor, contact 35 engaging contact 28. After a period of operation of the device as above described, the increased upward tension of spring 14 upon the end of lever 7, and possibly also a reduction in pressure within bell 10 due to the closing of the damper, causes lever 7 to return to neutral position, thus separating contacts 24 and 25 and breaking the circuit of the compensating motor. The circuit of the regulating motor will likewise be opened during the period of engagement of contacts 28 and 29 with contacts 35 and 36 respectively. The pressure reduction due to closure of the damper gradually is felt upon the balance and lever 7 then tips to close contacts 23 and 25, throwing the compensating motor again into operation, this time to lower rod 11 to return it to its normal position. The regulating motor will then operate during the time that frame 27 is to the right, in a direction to open damper 1, while operating in the reverse direction while frame 27 is to the left. When rod 11 is returned to normal, the temporary force has been completely removed from the balance and the operation of both motors is interrupted if the balance is now in equilibrium.

It will be observed that the complete operation of the specific apparatus described upon departure from normal balance of the regulated and regulating forces involves the following steps: (1) a continual addition of a force to the balance and a relatively rapid movement of the damper both in the direction tending to equilibrium of the balance; (2) three-force artificial equilibrium of the balance and slow movement of the damper in the same direction as in step (1); (3) three-force unbalance of the balance, continual removal of the third force and intermittent opposite movement of the damper of such magnitude as to be in effect a slow positioning of the damper in the direction opposite to that in step (1). The damper, therefore, upon an increase in flow, is first rapidly closed and then intermittently opened during definite periods of time and closed during shorter periods of time, which in effect correspond with a quick over-travel followed by a slow return to the desired final position. Regulation of the damper in this manner affords a rapid control of the flow while preventing hunting of the system as the damper is automatically returned from its position of over-travel prior to the complete reaction on the balance of the damper over-travel.

If, instead of an initial increase of flow, the flow had decreased for any reason, the operation of the regulator would have been just the reverse of that above described. A decrease in pressure within bell 10 would cause the closure of contacts 23 and 25 with consequent operation of both motors, the compensating motor acting to first lower rod 11 and then return it to normal position, and the regulating motor acting to open the damper too widely, followed by a partial closure thereof to a final position corresponding to the desired opening to compensate for the initial decrease of flow.

In the operation of the regulator of my patent above referred to, the damper is moved directly to its final position without over-travel and the temporary force is removed from the balance at a rate relatively much slower than that at which it is applied. My present regulator, by causing initial over-travel of the damper followed by an automatic return to its final position and by the relatively rapid removal of the temporary force, insures more rapid regulation than can be effected by the patented device, without reduction in the sensitivity, accuracy or stability of the former regulator.

I have now illustrated one embodiment of my invention. For convenience I have shown my new regulator arranged to maintain constant the pressure of a fluid by the control of a damper. Obviously my invention is not concerned with the particular element controlled nor with the controlling force or forces which in the particular case illustrated was a constant, being the value introduced by the position of the weight 8 upon the lever. Obviously this weight can be replaced with any desired fixed or varying force or forces without affecting my invention. The particular means herein shown for acting on the lever with a force varying as a function of the element controlled is of course immaterial, as any desired means may be used.

In the modification illustrated rod 11 and damper 1 are arranged to be directly driven by the compensating and regulating motors respectively; the circuits of the motors being opened and closed by the apparatus. Obviously my invention is not limited to such specific arrangement, as any means for suitably connecting driving means to rod 11 and damper 1 upon closure of the various electric circuits could be as readily employed. In a co-pending application, Serial No. 346,917, filed March 14, 1929, patented Nov. 25, 1930, No. 1,782,832, I have shown and described an improved modification of the regulator of my Patent No. 1,658,577. In the regulator of the above application a continuously operating electric motor is arranged to be coupled to a regulated element, such as a damper or valve to move the same in either direction upon energization of appropriate electromagnets. Such an arrangement corresponding with the element C of Fig. 7 of said application could be employed in connection with the present regulator to control either or both rod 11 and damper 1. Obviously other substitutions or rearrangement of parts could be made without departing from the spirit of my invention.

I claim:

1. In a regulator, a primary regulating member subjected to opposing regulating and regulated forces and causing regulating changes when such forces become unbalanced, and a modifying mechanism brought into operation by the movement of the primary regulating member comprising means for gradually adding and withdrawing a third force to the primary regulating member and means controlled jointly by the primary regulating member and the modifying mechanism for varying the rapidity and direction of the regulation during a regulating change.

2. In a regulator, a regulating balance subjected to opposed regulating and regulated forces, means for gradually applying and removing a third force to said balance during a regulating change, said means being adapted to control the rapidity and relative direction of the regulation according to its position with relation to the position of the balance.

3. In a regulating apparatus of the type wherein a force to be regulated opposes a controlling force upon a balance and said balance is normally maintained in equilibrium when said regulating force is that desired, the combination comprising means brought into operation upon departure from normal equilibrium of the balance for artificially restoring equilibrium by the addition of a third force to the balance, a controlled element adapted when moved to effect the force to be regulated, and means brought into operation by the departure from normal equilibrium of the balance and continuing in operation during artificial equilibrium thereof adapted when operated to directly adjust the position of said element to such position as will restore the regulated force to the value desired.

4. The combination according to claim 3 wherein the last mentioned means is arranged to cause said element to be adjusted to too great an extent during addition of said third force and during artificial equilibrium and to be intermittently moved toward and away from such extreme position during decrease in said third force due to departure of the balance in the opposite direction whereby the element will reach the desired final position and normal equilibrium will be obtained when the third force has been completely removed.

5. In a regulator for controlling the position of an element, a primary regulating member normally in equilibrium under opposed regulating and regulated forces, means brought into operation upon a departure of said member from equilibrium for simultaneously positioning the element and for adding a third force to said member in a direction to artificially restore equilibrium thereof, means for maintaining constant said third force and for positioning the element at a slower rate during artificial equilibrium of the member, and means brought into operation upon departure from artificial unbalance due to excess of said third force for removing said force and for oppositely positioning said element.

6. A regulator for controlling the position of an element comprising a balance, a member adapted when displaced from normal position to apply a force to said balance, means controlled by the position of said balance for moving said member, and means alternately controlled by the position of said balance and by the displacement of said member for moving the element.

7. A regulator according to claim 6 wherein the said means for moving the element is arranged to be controlled by the position of the balance for relatively longer periods of time than by the displacement of said member.

8. In a regulator for controlling the position of an element, a balance acted upon by a controlling force and by a force responsive to the position of the element and normally in neutral position when said forces are in equilibrium, means controlled by the departure of the balance from neutral for adding a third force to the balance in a direction to restore neutrality, means brought into operation during increase in said third force for moving said element in such direction as to restore equilibrium between the force responsive thereto and the controlling force, and means brought into operation during decrease in said third force for moving said element intermittently in opposite directions.

9. A regulator according to claim 8 wherein said last mentioned means is arranged to move the element in a direction to restore equilibrium between the force varying responsively with the position of the element and the controlling force for relatively shorter periods of time than to move it in the opposite direction.

10. In a regulator of the type wherein a regulating force opposes a force varying as a function of the element controlled upon a balance to effect control of the element upon departure of the balance from neutral, the combination comprising a compensating motor adapted when operated to vary an additional force upon said balance, means for throwing said motor into operation upon a departure of the balance from neutral to cause said additional force to be varied in a direction to restore neutrality of the balance, a regulating motor adapted to control the element, and means for operating said regulating motor in the same direction as said compensating motor during increase of said additional force and partly in the same direction and partly in the opposite direction during decrease of said additional force.

11. In a regulator of the type wherein a regulating force opposes a force varying as a function of the element controlled upon a balance to effect control of the element upon departure of the balance from neutral, the combination comprising a movable device adapted when displaced from normal position to apply an additional force to said balance, means thrown into operation upon a departure of said balance from neutral for moving said device in such direction as to tend to restore the balance to neutral, driving means for controlling said element arranged to be operated either by said means thrown into operation upon departure of the balance from neutral or by means dependent upon the direction of displacement of said movable device from normal, and continuously operating means adapted to alternately connect said driving means to said operating means therefor.

12. The combination according to claim 11 including a horizontally movable member biased toward one position and intermittently driven against the bias by said continuously operating means, said horizontally movable member being adapted when said member is in one position and when said balance has departed from neutral to close an electrical circuit for said driving means, and adapted when said member is in another position and said device is displaced from normal to close another electrical circuit for said driving means.

13. A regulator for controlling the position of an element comprising a balance, a member adapted when displaced from normal position to apply a force to said balance, means controlled by the position of said balance for moving said member, means for adjusting the position of the element, a movable device adapted to control the operation of said last mentioned means jointly with the position of said balance in one position and jointly with the position of said member in another position, and means for intermittently moving said device from one of said positions to the other of said positions.

14. A regulator according to claim 13 wherein said last mentioned means includes biasing means normally tending to hold said device in the position where control of said driving means is effected jointly with the position of the balance and a continuously rotated cam adapted to intermittently move said device against the biasing means to such position as to control the driving means jointly with the position of displacement of said member.

15. A regulator for controlling the position of an element comprising in combination a reversible switch, the movable member of which is acted upon by a controlling force and by a force responsive to the position of the element, a device adapted when displaced from normal position to add a force to the movable member of said switch, electrical driving means for moving said device and actuated upon a closure of said switch, a second device biased toward one position and adapted to be intermittently moved for relatively short periods of time to a second position against said bias, and electrical driving means for positioning said element actuated when said switch is closed and said second device is in the first mentioned position and actuated when said first device is displaced and said second device is in the last mentioned position.

16. The combination according to claim 15 in which said electrical driving means for positioning the element is operated in the same direction at each position of said second device during increase in the additional force and in opposite directions at each position during decrease in said additional force.

In testimony whereof, I have signed my name to this specification.

CHARLES H. SMOOT.